United States Patent Office 3,106,064
Patented Oct. 8, 1963

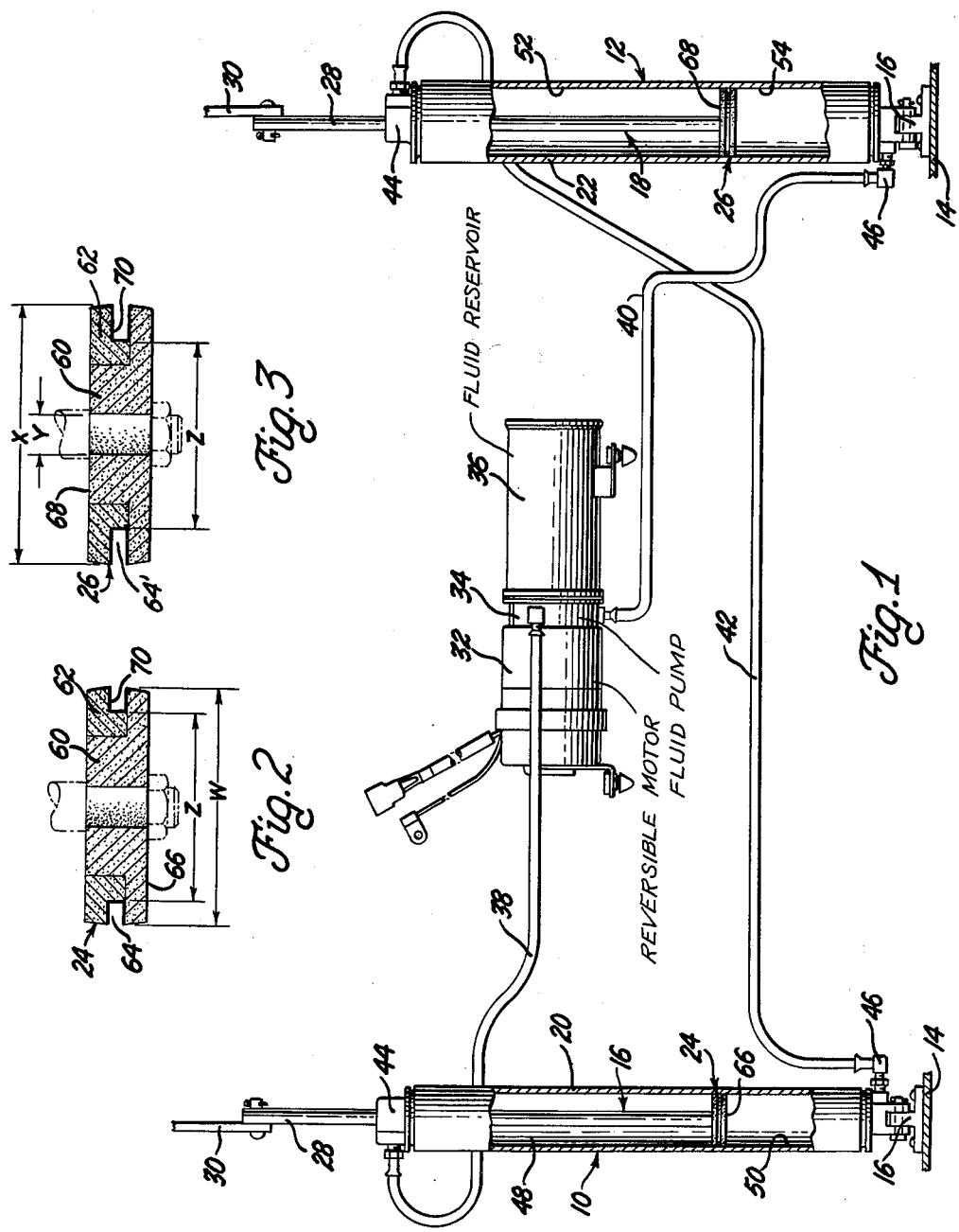

3,106,064
FLUID PRESSURE CONTROL
Stewart B. McLeod, Southfield Township, Oakland County, Mich., assignor to Dura Corporation, Oak Park, Mich., a corporation of Michigan
Filed Oct. 21, 1960, Ser. No. 64,064
4 Claims. (Cl. 60—52)

This invention relates to fluid pressure systems in general, and more particularly to means for synchronizing dual acting fluid pressure systems.

It is relatively common to use separate and operatively interconnected fluid pressure piston cylinder means for actuating a work load having a wide girth. An example of such a power actuated mechanism is the folding top structure of a convertible automobile.

The folding top structure of a convertible is required to be moved between definite predetermined limits. Any overtravel or misalignment of the top header or side rails over the windshield header and door or quarter window glasses can produce stresses and strains in the whole top and vehicle body structures. Such stresses are particularly severe when the top is secured to the windshield header bar or is fully retracted into a folded position in the vehicle body.

Aside from the problems of mechanical alignment to avoid distortions, it is equally important that the fluid pressures in the different power cylinders which actuate the top structure be equalized and synchronously applied to avoid the hazards of misalignment and overtravel.

It is also important in fluid pressure systems of this and like type that precautions be taken to avoid the pressures of fluid expansion. This is particularly true with closed cycle fluid systems where expansive pressures may burts flow lines or cause other damage.

It is an object of this invention to provide a closed cycle fluid pressure system making use of separate and synchronously interconnected fluid pressure piston cylinders.

It is an object of this invention to provide a dual power cylinder system including simplified and inexpensive means of fluid pressure synchronization.

It is also an object of this invention to provide a simplified, inexpensive and relatively trouble-free means of avoiding the hazards of excessive pressures due to fluid expansion in a closed fluid system.

Another object of this invention is to teach the complementary use of separate dual acting power cylinders and means readily permitting the exchange of fluid therebetween under equal pressure conditions.

Still another object of this invention is to teach means providing relief against excessive and damaging fluid pressures, in a closed system or elsewhere, without disturbing the equilibrium of a balanced fluid pressure system.

A further object of this invention is to provide fluid pressure relief means for fluid pressure systems which includes no movable parts and is essentially trouble-free.

A still further object of this invention is to provide such fluid pressure relief means within the self-synchronous system aforesaid.

These and other objects and advantages to be gained in the practice of this invention will be more apparent upon a reading of the following description of a fluid pressure system for folding convertible tops, with reference to the accompanying drawing wherein:

FIGURE 1 is an isolated view of the components of the fluid pressure system used to actuate the convertible top structure of an automotive vehicle and including the features of this invention.

FIGURE 2 is a cross-sectional view of one of the piston members of one of the power cylinders shown by FIGURE 1.

FIGURE 3 is a cross-sectional view of the piston member of the other power cylinder shown by FIGURE 1.

The fluid pressure system shown by FIGURE 1 is a system particularly suited for actuation of the folding structure of a convertible top mechanism for motor vehicles.

A pair of piston cylinders 10 and 12 are used as the power units to raise and lower the top structure (not shown). The power cylinders are disposed in fixed and generally parallel spaced relation on each side of the vehicle body. Each cylinder member is secured to the vehicle or body frame 14 by a bracket 16 which permits rocking movement of the cylinder in the course of actuating the folding top structure.

The power cylinders 10 and 12 include piston members 16 and 18, respectively, which are guided for reciprocal travel within the cylinder bodies 20 and 22. The piston heads 24 and 26 of the respective piston members are responsive to fluid pressure conditions on opposite sides thereof to operate the piston rods 28. The piston rods 28 are connected to the top operating linkage 30, of which only a part is shown.

A subassembly including a reversible motor 32, fluid pump 34 and fluid reservoir 36 is provided between the two power cylinders 10 and 12. The fluid pump 34 is connected to respectively opposite ends of the cylinders 10 and 12 by fluid flow lines 38 and 40 while the other ends of the cylinders are interconnected by a separate flow line 42. The fluid flow connections 44 and 46 near the opposite closed ends of the cylinders are receptive of fluid flow in either direction therethrough.

Fluid introduced into the chamber space 48 of cylinder 10 will cause the piston member 16 to be retracted and will force fluid from the chamber space 50 thereof into the chamber space 52 of the other cylinder member 12. Such fluid will in turn act upon the piston member 18 and cause it to be retracted while forcing fluid from the chamber space 54 back to the pump and reservoir assembly. Conversely, fluid introduced into the chamber space 54 will cause fluid flow through the different chamber spaces and connecting flow lines which will cause the piston members 16 and 18 to be extended rather than retracted.

To assure synchronous actuation of the piston members 16 and 18, the pressure responsive faces of the piston heads 24 and 26 which are exposed to the chamber spaces 50 and 52 must be of equal area. In the present instance this is accomplished by having the cylinder body 22 sufficiently larger than the cylinder body 20 so as to offset the cross-sectional area of the piston rod 28 which extends through the chamber space 52.

Referring now to FIGURES 2 and 3:

The piston heads 24 and 26 are of similar construction. Each is made of two parts 60 and 62 and both parts are of a powdered metal of uniform consistency. Each is formed to receive the piston rod 28 centrally therethrough and each is formed to provide a piston ring groove 64.

In the present instance, the piston heads are of the same thickness. However, the piston head 26 is larger in diameter than the piston head 24 by an amount such that the area of the underside face 66 of piston 24 is equal to the area of face 68 of piston 26 less the area of the piston rod 28, that is:

$$\pi W/2^2 = \pi X/2^2 - \pi Y/2^2$$

The matching of the interconnected piston areas 66 and 68 assures synchronous actuation of the piston members 16 and 18. However, the resulting difference is the piston areas exposed to fluid pump pressures in chambers 48 and 54 presents a problem as regards the relative rates of advance and return travel.

The larger area of piston 26 requires more fluid to be supplied to chamber 54 to actuate piston 26 than is required to be delivered to chamber 48 to actuate piston 24. Accordingly, with a conventional constant speed pump driven by a shunt motor the advance stroke will take longer than the return stroke.

In the present instance, a series motor 32 is used to drive the pump 34. Since the resisting pressure is less in moving piston 26 than it is in moving piston 24, the pump will speed up to deliver more volume to chamber 54 and will slow down, relatively speaking, when delivering fluid to chamber 48. As a consequence, the rates of the forward and reverse strokes of pistons 16 and 18 will be substantially the same.

Returning to the construction of the piston heads:

The ring groove 64' of the piston head 26 is of a different dimension than that of the ring groove 64 of the piston member 24. The ring groove 64' is deeper than the ring groove 64 such that the areas $\pi Z/2^2$ are equal. In addition, both of the ring grooves 64 and 64' include a sealing coat 70 entirely therewithin and around.

The powdered metal composition of the piston heads 24 and 26 affords a porosity which is responsive to a predetermined fluid pressure condition on either side thereof. This enables the pressure fluid in the fluid system to be forced through the piston heads and to relieve the high pressure condition automatically.

In the disclosed fluid flow control system, the equal central areas of porosity between the ring grooves and piston rods of the piston heads 24 and 26 assures a uniform passage of pressure fluid through both piston members and synchronous relief as regards both thereof.

Under normal operating conditions the fluid pressures in the disclosed system attain a maximum of approximately 300 p.s.i. However, when the top operating mechanism is in operation and the convertible top header bar is locked to the windshield header, or overtravel pressures are otherwise induced, there is danger of attaining higher fluid pressures which may burst fluid flow lines or cause parts of the operating mechanism to be bent, distorted or unduly strained. Such excessive pressures may also be induced by fluid expansion on extremely hot summer days.

In the disclosed fluid control system, with the pressure responsive porous piston heads 24 and 26, normal operating pressures below 300 p.s.i. cause the operating mechanism to operate as expected. However, under pressures substantially exceeding normal, for example, 800 p.s.i. to 1000 p.s.i., the excessive pressure condition will force fluid through the porous pistons and thereby relieve the dangerous condition before any damage is done. Further, since the piston heads 24 and 26 are of equal area, thickness and porosity, the escape of fluid from chamber 48 or 54 will pass through the piston heads 24 and 26 as well as the chamber spaces 50 and 52 to the other thereof. This will cause the piston members 16 and 18 to synchronously adjust to the situation and will not impose any excessive pressure condition on either one or both of the operating members.

It will be appreciated that the relative area, thickness and porosity of the piston members 24 and 26 may differ and that the major importance is that these factors be balanced to allow equal fluid flow through both. Accordingly, any dimensional or material changes or construction changes, such as having parts of the piston heads of non-porous material rather than providing a non-porous seal within the piston ring grooves, is within the scope and spirit of this invention.

I claim:

1. A fluid pressure system, comprising: a pair of hydraulic cylinders disposed in parallel spaced relation and having piston members provided therein and piston rods connected to said piston members and extended through respectively adjacent ends of said cylinders, said cylinders having fluid chambers provided therein of respectively different cross-sectional areas and having the chamber area on one side of one of said piston members being of equal cross-sectional area to the chamber area on the opposite side of the other of said piston members, means connecting said chambers of equal cross sectional area and providing for the unobstructed transfer of fluid therebetween at all times, reversible fluid transfer means provided between the other of said chamber areas for activating one of said piston members and the other thereof in unison therewith in the course of fluid transfer between said chambers of equal area, and said piston members having a complementary fluid pressure responsive porosity permissive of the free exchange of fluid through each of the piston members only under fluid pressures above a predetermined normal operating pressure, and the porosity of said pistons being such that the quantity of flow of fluid through the porous pistons at any pressure above the normal pressure is such as to cause said pistons to move in synchronism at the same rate.

2. The fluid pressure system of claim 1: said piston rods being of equal cross-sectional area, said piston members being of unequal cross-sectional area and of like porosity, and means provided on the piston member of larger cross-sectional area and restrictive of the area of porosity to that of the other of said piston members.

3. The fluid pressure system of claim 1, wherein said rods are of equal cross sectional area, one of said piston members being larger in diameter than the other but of the same porosity, each of said piston members having a peripheral groove formed therein, sealing means in said grooves sealing all the pores in the surfaces of said grooves, the groove in the larger of said piston members having a radial dimension larger than the groove in the smaller piston member whereby each of said piston members has a central porous area of substantially the same size.

4. A fluid pressure system as defined in claim 3, wherein the other of said chamber areas are of different cross sectional sizes, said reversible fluid transfer means including a pump, conduit means connecting said pump to the other of said chamber areas, a reversible series type electric motor drivingly connected to said pump, said motor having the characteristic of operating at a speed in proportion to the load imposed thereon whereby said motor and pump will supply fluid to each of said other chamber areas at different rates so as to move said piston members in either direction at the same speed.

References Cited in the file of this patent

UNITED STATES PATENTS

| | | |
|---|---|---|
| 2,100,445 | Le Bleu | Nov. 30, 1937 |
| 2,270,943 | Freundel et al. | Jan. 27, 1942 |
| 2,462,580 | Watson | Feb. 22, 1949 |
| 2,640,323 | McLeod | June 2, 1953 |
| 2,663,143 | Joy | Dec. 22, 1953 |
| 2,744,385 | Hohenner | May 8, 1956 |
| 2,768,500 | Tyier | Oct. 30, 1956 |
| 2,779,644 | Lovatt | Jan. 29, 1957 |
| 2,780,504 | Russell | Feb. 5, 1957 |
| 2,830,859 | Parsons | Apr. 15, 1958 |
| 2,940,262 | Pfitzenmeier | June 14, 1960 |